US008885791B2

(12) United States Patent
Russell, II et al.

(10) Patent No.: US 8,885,791 B2
(45) Date of Patent: Nov. 11, 2014

(54) FUEL RODS HAVING IRRADIATION TARGET END PIECES

(75) Inventors: William Earl Russell, II, Wilmington, NC (US); David Grey Smith, Leland, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 2385 days.

(21) Appl. No.: 12/000,828

(22) Filed: Dec. 18, 2007

(65) Prior Publication Data

US 2014/0307844 A1    Oct. 16, 2014

(51) Int. Cl.
G21C 3/34        (2006.01)
G21G 1/02        (2006.01)
G21G 1/00        (2006.01)

(52) U.S. Cl.
CPC ... *G21G 1/02* (2013.01); *G21G 1/00* (2013.01)
USPC ........................................................ 376/438

(58) Field of Classification Search
CPC .................................. G21G 1/02; G21G 1/00
USPC ........................................................ 376/438
See application file for complete search history.

(56) References Cited

U.S. PATENT DOCUMENTS

| | | | |
|---|---|---|---|
| 3,431,170 A | 3/1969 | Lass et al. | |
| 3,940,318 A | 2/1976 | Arino et al. | |
| 3,998,691 A | 12/1976 | Shikata et al. | |
| 4,093,756 A * | 6/1978 | Donaghy | 427/304 |
| 4,196,047 A | 4/1980 | Mitchem et al. | |
| 4,284,472 A | 8/1981 | Pomares et al. | |
| 4,462,956 A | 7/1984 | Boiron et al. | |
| 4,475,948 A | 10/1984 | Cawley et al. | |
| 4,493,813 A * | 1/1985 | Loriot et al. | 376/409 |
| 4,532,102 A | 7/1985 | Cawley | |
| 4,597,936 A | 7/1986 | Kaae | |
| 4,617,985 A | 10/1986 | Triggs et al. | |
| 4,663,111 A | 5/1987 | Kim et al. | |
| 4,729,903 A | 3/1988 | McGovern et al. | |
| 4,782,231 A | 11/1988 | Svoboda et al. | |
| 4,859,431 A | 8/1989 | Ehrhardt | |

(Continued)

FOREIGN PATENT DOCUMENTS

| | | |
|---|---|---|
| EP | 0 076 204 | 1/1986 |
| EP | 1667165 A2 * | 6/2006 |

(Continued)

OTHER PUBLICATIONS

European Patent Office search report, EP08171452, dated Jul. 25, 2012.*

(Continued)

*Primary Examiner* — Frank J McGue
(74) *Attorney, Agent, or Firm* — Harness, Dickey & Pierce, P.L.C.

(57) ABSTRACT

Example embodiments are directed to a fuel rod having end pieces on either end containing irradiation targets. Example embodiment end pieces may contain materials that may be converted to desired isotopes when exposed to neutron flux encountered at the end piece position. Example embodiment end pieces may be fabricated from the materials or may otherwise house the materials. Example embodiment end pieces may mate with a variety of full-length and/or part-length fuel rods and may function as upper and/or lower end plugs, mating the fuel rods to upper and/or lower tie plates.

19 Claims, 5 Drawing Sheets

(56) References Cited

U.S. PATENT DOCUMENTS

| | | |
|---|---|---|
| 5,053,186 A | 10/1991 | Vanderheyden et al. |
| 5,145,636 A | 9/1992 | Vanderhevden et al. |
| 5,355,394 A | 10/1994 | van Geel et al. |
| 5,400,375 A | 3/1995 | Suzuki et al. |
| 5,513,226 A | 4/1996 | Baxter et al. |
| 5,596,611 A | 1/1997 | Ball |
| 5,615,238 A | 3/1997 | Wiencek et al. |
| 5,633,900 A | 5/1997 | Hassal |
| 5,682,409 A | 10/1997 | Caine |
| 5,758,254 A | 5/1998 | Kawamura et al. |
| 5,867,546 A | 2/1999 | Hassal |
| 5,871,708 A | 2/1999 | Park et al. |
| 5,910,971 A | 6/1999 | Ponomarev-Stepnoy et al. |
| 6,056,929 A | 5/2000 | Hassal |
| 6,160,862 A | 12/2000 | Wiencek et al. |
| 6,192,095 B1 | 2/2001 | Sekine et al. |
| 6,233,299 B1 | 5/2001 | Wakabayashi |
| 6,456,680 B1 | 9/2002 | Abalin et al. |
| 6,678,344 B2 | 1/2004 | O'Leary et al. |
| 6,751,280 B2 | 6/2004 | Mirzadeh et al. |
| 6,804,319 B1 | 10/2004 | Mirzadeh et al. |
| 6,895,064 B2 | 5/2005 | Ritter |
| 6,896,716 B1 | 5/2005 | Jones, Jr. |
| 7,157,061 B2 | 1/2007 | Meikrantz et al. |
| 7,235,216 B2 | 6/2007 | Kiselev et al. |
| 2002/0034275 A1 | 3/2002 | Abalin et al. |
| 2003/0012325 A1 | 1/2003 | Kernert et al. |
| 2003/0016775 A1 | 1/2003 | Jamriska, Sr. et al. |
| 2003/0103896 A1 | 6/2003 | Smith |
| 2003/0179844 A1 | 9/2003 | Filippone |
| 2004/0091421 A1 | 5/2004 | Aston et al. |
| 2004/0105520 A1 | 6/2004 | Carter |
| 2004/0196942 A1 | 10/2004 | Mirzadeh et al. |
| 2004/0196943 A1 | 10/2004 | Di Caprio |
| 2005/0105666 A1 | 5/2005 | Mirzadeh et al. |
| 2005/0118098 A1 | 6/2005 | Vincent et al. |
| 2006/0062342 A1 | 3/2006 | Gonzalez Lepera et al. |
| 2006/0126774 A1 | 6/2006 | Kim et al. |
| 2007/0133731 A1 | 6/2007 | Fawcett et al. |
| 2007/0133734 A1 | 6/2007 | Fawcett et al. |
| 2007/0297554 A1 | 12/2007 | Lavie et al. |
| 2008/0031811 A1 | 2/2008 | Ryu et al. |
| 2008/0076957 A1 | 3/2008 | Adelman |

FOREIGN PATENT DOCUMENTS

| | | |
|---|---|---|
| GB | 1 204 351 | 9/1970 |
| GB | 1 204 351 A | 9/1970 |
| GB | 2 144 899 | 3/1985 |
| GB | 2 144 899 A | 3/1985 |
| JP | 58-68694 | 4/1983 |
| JP | 61-131696 | 8/1986 |
| JP | 02-083497 | 6/1990 |
| TW | 200625344 A | 7/2006 |

OTHER PUBLICATIONS

Search Report issued in connection with EP Application No. 08171452.9, Jun. 21, 2012.

Japanese Office Action mailed Sep. 24, 2013 for corresponding Japanese Application No. 2008-319105.

Taiwan Office Action dated Apr. 21, 2014, issued in Corresponding Taiwan Application No. 097147444.

Japanese Office Action issued in Japanese Application No. 2008-319105, dated Aug. 5, 2014.

* cited by examiner

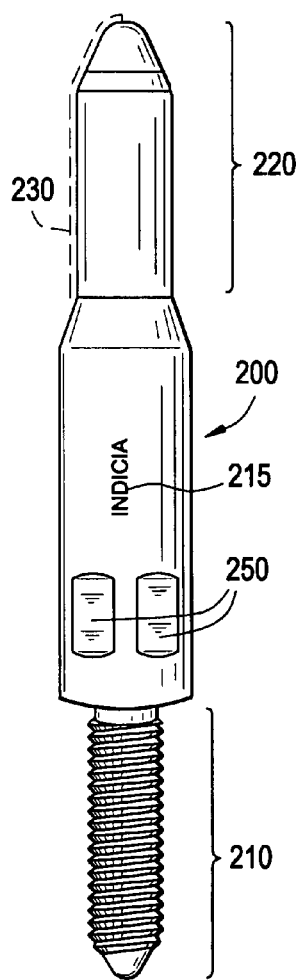
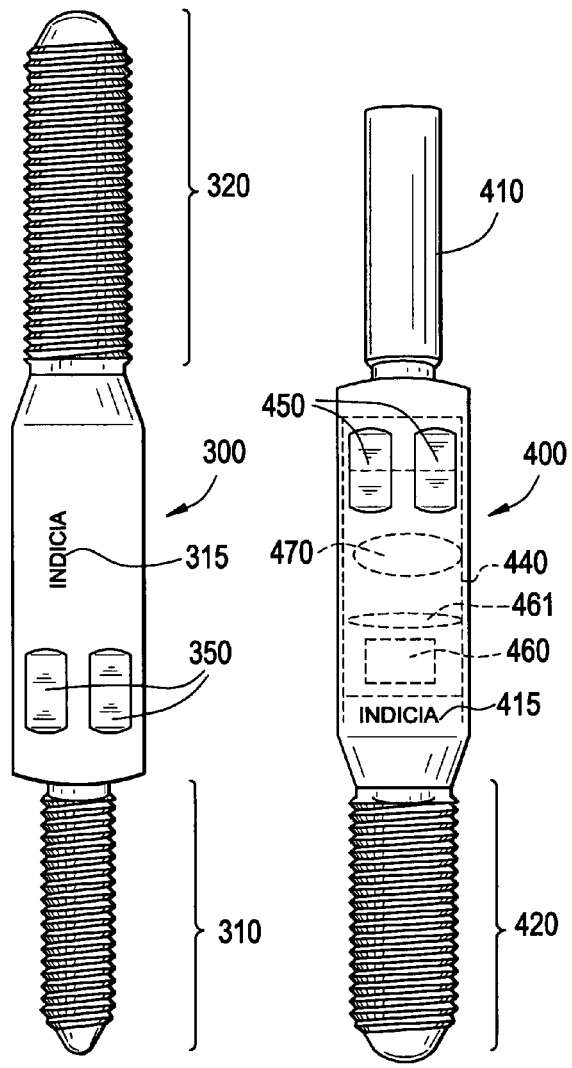
FIG. 3   FIG. 4   FIG. 5

FUEL RODS HAVING IRRADIATION TARGET END PIECES

BACKGROUND

1. Field

Example embodiments generally relate to fuel structures and materials used in nuclear power plants.

2. Description of Related Art

Generally, nuclear power plants include a reactor core having fuel arranged therein to produce power by nuclear fission. A common design in U.S. nuclear power plants is to arrange fuel in a plurality of fuel rods bound together as a fuel assembly, or fuel bundle, placed within the reactor core. These fuel rods typically include several elements joining the fuel rods to assembly components at various axial locations throughout the assembly.

SUMMARY

Example embodiments are directed to a fuel rod having end pieces on either end containing special targets. Example embodiment end pieces may contain materials that may be converted to desired isotopes when exposed to neutron flux at the end piece position. Example embodiment end pieces may be fabricated from the selected target material(s) or may be hollow and contain the target material(s). Example embodiment end pieces may mate with a variety of example embodiment full-length and/or part-length fuel rods and may function as upper and/or lower end plugs, mating the fuel rods to upper and/or lower tie plates.

Example embodiment fuel rods may otherwise contain standard components including nuclear fuel and be useable in an operating nuclear reactor. Example embodiment fuel rods having example embodiment end pieces may thus generate a variety of desired isotopes in their irradiation target end pieces while simultaneously functioning as a conventional fuel rod providing power to the operating core.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 1 is an illustration of a fuel assembly having example embodiment end pieces affixed to fuel rods.

FIGS. 2A, 2B, and 2C are illustrations of example embodiment fuel rods including example embodiment end pieces.

FIG. 3 is a detailed illustration of an example embodiment end piece.

FIG. 4 is a detailed illustration of another example embodiment end piece.

FIG. 5 is a detailed illustration of another example embodiment end piece.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
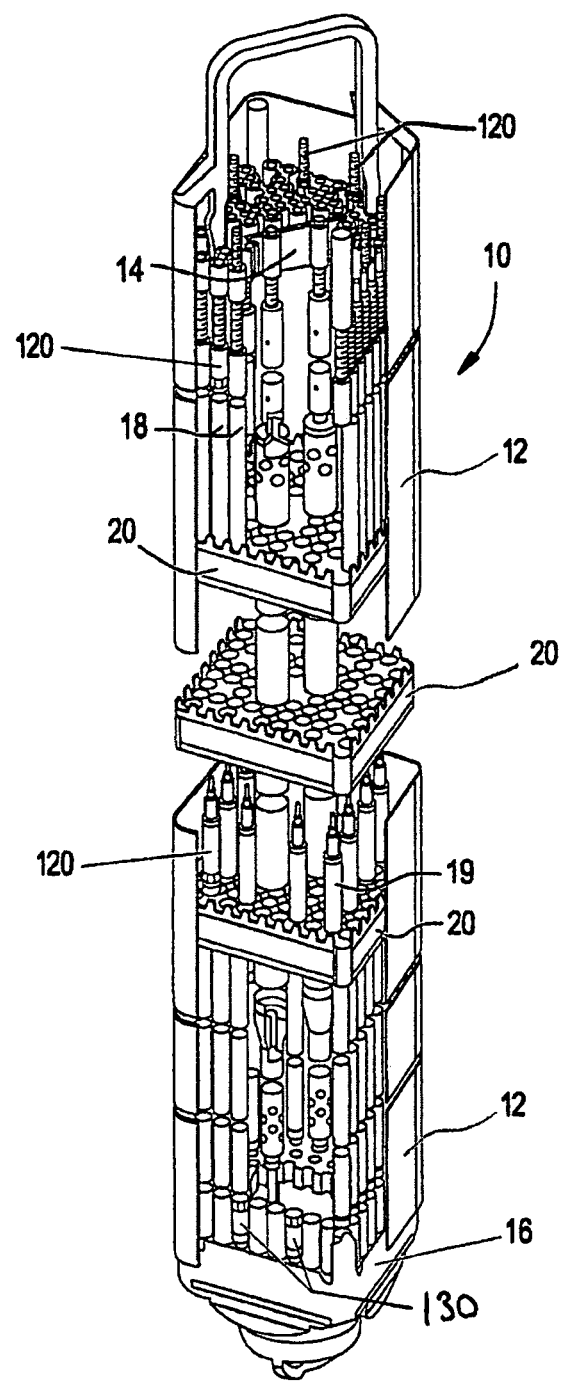

As shown in FIG. 1, a fuel assembly 10 of a nuclear reactor, such as a BWR, may include an outer channel 12 surrounding an upper tie plate 14 and a lower tie plate 16. A plurality of full length fuel rods 18 and/or part length fuel rods 19 may be arranged in a matrix within the fuel assembly 10 and pass through a plurality of spacers 20. An example embodiment upper end piece 120 and/or lower end piece 130 may join the fuel rods 18 and 19 to the upper and lower tie plates 14 and 16, with only the lower end piece 130 so joining in the case of part-length rods 19. The example embodiment end pieces 120 and 130 may mate with, and in the case of tie rods, pass through, the upper and lower tie plates 14 and 16, respectively, and may secure fuel rods 18 or 19 axially in the fuel assembly 10.

Figure 2A:
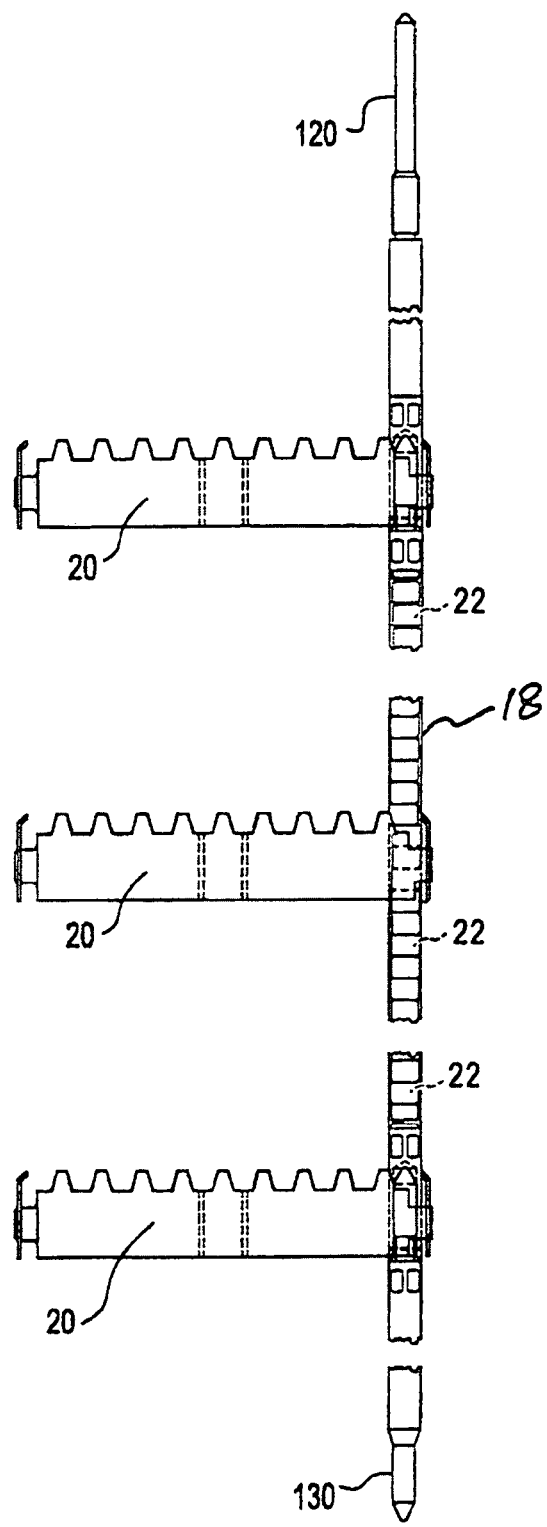
Figure 2B:
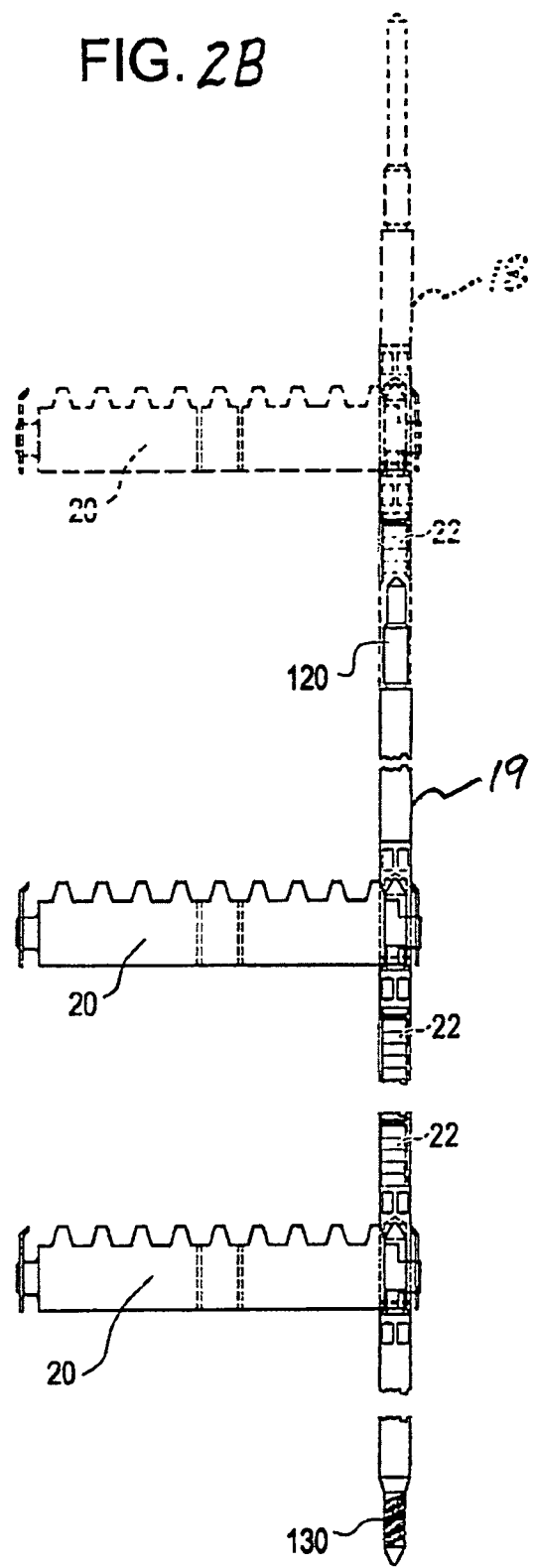
Figure 2C:
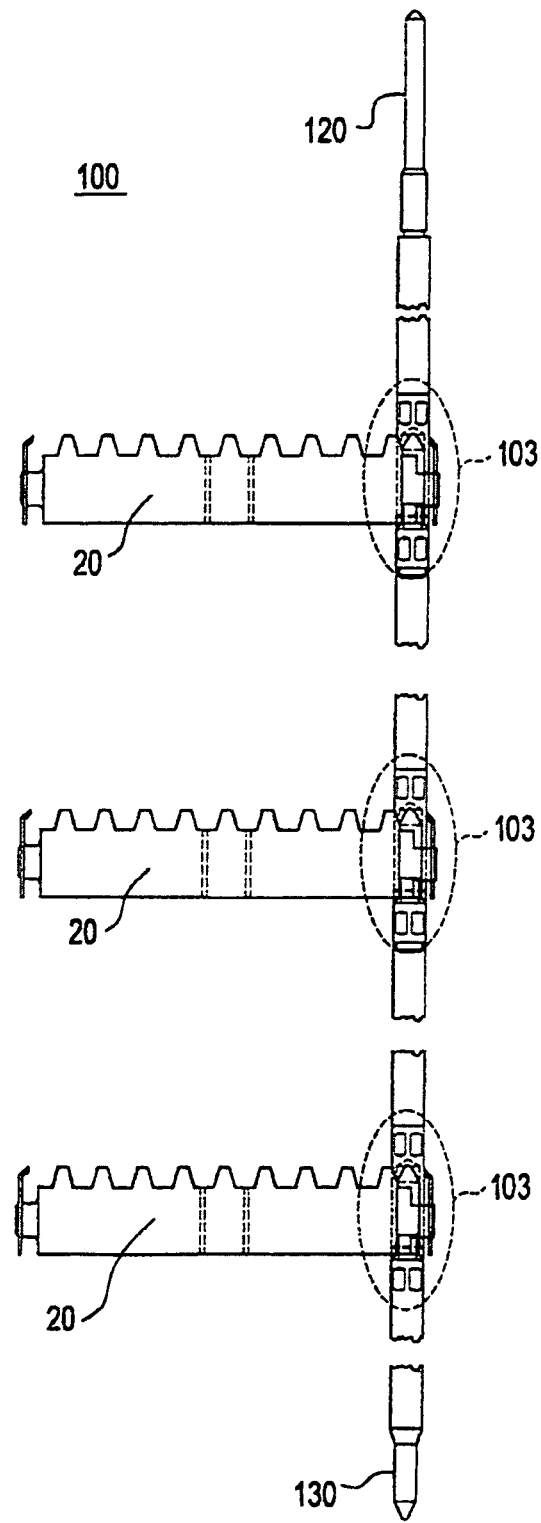

FIGS. 2A, 2B, and 2C illustrate example embodiment full-length fuel rod 18, part-length fuel rod 19, and segmented rod 100, respectively, each having two example embodiment fuel rod end pieces 120 and 130 at either end of example embodiment fuel rods 18, 19, and 100. Aside from example embodiment end pieces 120 and 130, fuel rods 18 and 19 may contain conventional elements found in a variety of fuel rods, including fuel elements 22 and cladding. For example, example embodiment fuel rod 18 shown in FIG. 2A may be a full-length fuel rod conventionally found in a BWR fuel assembly, with the exception of example embodiment end pieces 120 and 130. Example embodiment fuel rod 19 shown in FIG. 2B may be a part-length fuel rod conventionally found in a BWR fuel assembly, with the exception of example embodiment end pieces 120 and 130. Full-length fuel rod 18 is shown in shadow in FIG. 2B to illustrate the reduced length of part-length fuel rod 19. In part-length fuel rod 19, example embodiment end piece 130 may join with a lower tie plate (not shown) and example embodiment end piece 120 may not join with anything, as the part-length fuel rod 19 may terminate mid-bundle. Example embodiment end piece 130 may be threaded or have other additional mating elements to secure the part-length fuel rod 19 with the lower tie plate, because part-length fuel rod 19 may not join to the assembly at example embodiment upper end piece 120. Example embodiment fuel rod 100 shown in FIG. 2C may be segmented, with several rod segments removably joining at connection points 103, as described in related application Ser. No. 11/002,677, filed Dec. 3, 2004, titled ROD ASSEMBLY FOR NUCLEAR REACTORS, and application Ser. No. 11/987,160, filed Nov. 28, 2007, titled SEGMENTED FUEL ROD BUNDLE DESIGNS USING FIXED SPACER PLATES, the fuel rods and segments of which, with exception to the end plugs of such fuel rods and segments, are incorporated by reference. Alternatively, fuel rods used in PWRs or CANDU-type reactors may be used in conjunction with example embodiment end pieces 120 and 130.

Example embodiment end pieces 120 and 130 may be fabricated from or contain isotopes, such as cadmium, cobalt, iridium, nickel, thallium, and thulium isotopes, that may be converted to desired isotopes when exposed to operating conditions in a nuclear reactor core. Example isotopes have substantial nuclear cross-sections and more readily change in the presence of a neutron flux, as opposed to conventional materials used to fabricate upper and lower end plugs, which may be chosen for their non-interactivity with neutron flux. For example, end pieces may be fabricated of Iridium-191 and/or Cobalt-59 or such isotopes may be placed in example end pieces 120 and 130. Neutron flux within the core at positions of the example embodiment end pieces 120 and 130 may convert the Iridium-191 to Iridium-192, which may decay into stable Platinum-192, a relatively scarce and expensive material useful in a variety of emerging technologies. Similarly, Cobalt-59 may convert into Cobalt-60, useful and highly-demanded for cancer treatment, under the same conditions.

Several other isotopes are capable of being produced in example embodiment end pieces 120 and 130. Further, because example embodiment end pieces 120 and/or 130 may be placed at positions within the core with unique neutron flux levels, e.g., at ends of the core with lower and more constant flux profiles, isotopes with shorter half-lives or higher cross-sections may be exposed to flux levels better suited to producing desirable materials from these isotopes.

Example embodiment end plugs 120 and 130 are shown in FIGS. 2A, 2B, and 2C shaped as upper and lower end plugs, respectively, that may connect with upper and lower tie plates. In this example, example embodiment end pieces 120 and 130 may replace conventional upper and lower end plugs in a variety of known fuel rod designs. Example embodiment end pieces 120 and 130 may be generally shaped in a tapered form to mate with upper and/or lower tie plates and secure example embodiment fuel rods 18, 19 and 100 to upper and/or lower tie plates.

Alternatively, example embodiment end pieces 120 and 130 may be shaped as non-tapered end plugs that do not connect with tie plates. For example, if example embodiment fuel rod 100 is a part-length rod, an upper example embodiment end piece 120 may extend from the end of the part-length fuel rod without connecting to anything.

Example embodiment end pieces 120 and 130 may join with example embodiment fuel rod 100 in a variety of ways. For example, example end pieces 120 and 130 may be welded directly to example embodiment fuel rods or removably mated to example embodiment fuel rods by a screw and threaded hole, a tang and receptor, or another effective joining element. Example end pieces 120 and 130 may mate and/or be welded flush with example embodiment fuel rods so as to present a continuous outer diameter along example embodiment fuel rods and reduce or prevent debris catching between example embodiment end pieces and example fuel rods.

As shown in FIG. 3, example embodiment end piece 200 may be generally solid and rigid. Example embodiment end piece 200 may include connection element 210. Connection element 210 is shown as a threaded portion in FIG. 3 that mates with a threaded hole in an example embodiment fuel rod to removably secure the end piece 200 and fuel rod. Example embodiment end piece 200 may include a taper 220 configured to fit into a tie plate as discussed above. Taper 200 may further be shaped to receive an expansion spring (not shown) that fits between the example end piece 200 and tie plate and allows small axial expansion and contraction of example embodiment fuel rods relative to tie plates.

Example embodiment end piece 200 may be formed of a target material that is solid and rigid, such that the end piece 200 is the target and still functions as an end piece for potential connection to upper or lower tie plates. For example, end piece 200 may be formed entirely out of Iridium-191.

Alternatively, example embodiment end piece 200 may be plated or cladded with rigid, non-reactive cladding material 230, such as nickel. Example embodiment end piece 200 may be fabricated of a less rigid and/or less easily handled material, such as Cobalt-59, for example, when the cladding material 230 is present. In this way, cladding material 230 may act as a rigid containment for example embodiment end piece 200.

Example embodiment end piece 200 may further include a series of indentions 250 that form, for example, a hex-shaped cross-section, at a base in order to facilitate handling, connection, and dismantling of example end pieces. Example embodiment end piece 200 may further include an indicia 215 that identifies the end piece 200 and any target or product isotope present therein. Indicia 215 may be stamped directly into example end piece 200 or may be otherwise affixed to the end piece 200.

Example embodiment end piece 200 may be varied in several ways. For example, example end piece 200 may not be tapered or sized to fit in an upper or lower tie plate. Similarly, example embodiment end piece 200 may be used at either a top or a bottom position on an example embodiment fuel rod including the example end piece 200. Further, connection element 210 may take on a variety of forms, such as bayonet, wedge joint, or snap-in type receptor, in order to removably attach example embodiment end piece 200 to a variety of potential example embodiment fuel rods. Connection element 210 may alternatively be absent, and example embodiment end piece may be directly welded to example embodiment fuel rods.

Another example embodiment end piece 300 is shown in detail in FIG. 4. Example embodiment end piece 300 may include several redundant elements with example embodiment end piece 200 in FIG. 3, whose description is omitted. For instance, the indicia 315, indentions 350, and connection element 310 in FIG. 4 may be as described in connection with indicia 215, indentions 250, and connection element 210, respectively, in FIG. 3. Example embodiment end piece 300 may include a threaded, non-tapered end 320 that is longer than example embodiment end piece 200's tapered end 220. The longer end 320 may include threads or other fastening means and be suitable for rigidly joining example embodiment end piece 300 to an upper tie plate (element 14 in FIG. 1). Due to the increased length, example embodiment end piece 300 may pass through an upper tie plate and permit an example embodiment fuel rod to which it is joined to act as a tie rod. That is, the threaded, longer end 320 may permit example embodiment fuel rods that include them to act as tie rods do in conventional fuel assemblies, allowing access and handling to example fuel assemblies containing the tie rods.

Another example embodiment end piece 400 is shown in detail in FIG. 5. As shown in FIG. 5, example end piece 400 may include a housing 440 that is hollow and may receive and contain one or more irradiation targets. Example embodiment end piece 400 may be fabricated of a rigid, nonreactive material that substantially maintains its nuclear properties when exposed to operating conditions within a nuclear reactor, including, for example, a zirconium alloy and/or aluminum.

Housing 440 may be shaped in order to receive irradiation targets and preserve the strength and containment capability of example end piece 400. Solid, liquid, or gas irradiation targets may be placed directly into housing 440 during manufacture of example end piece 400. Alternatively, an additional container 460 may hold desired irradiation targets and be placed within housing 440. Container 460 may be containers described in application Ser. No. 11/002,677, the containment assembly of which is incorporated by reference. Multiple containers 460 may be placed within the housing 440 in order to utilize different types of individually-contained irradiation targets without mixing the different targets. Each container 460 may include a container indicia 461 that identifies the contents of individual containers 460. Alternatively, housing 440 may include one or more wafers or caps 470 rigidly affixed to the example end piece 400 that compartmentalize the housing 440. In this way, multiple irradiation targets within housing 440 may be separated by the wafers or caps 470.

Example embodiment end piece 400 may include indentions (or hexes) 450 as in other embodiments. Hexes 450 may further aid during dismantling of example end piece 400 in order to harvest irradiation targets contained within housing 440 by providing a lower breaking torque at specific points to access the housing 440. Indicia 415 may be attached or stamped into an exterior of example embodiment end pieces 400 and indicate what target(s) are contained in a housing 440.

As shown in FIG. 5, example embodiment end piece may include a threaded end 420 that may screw directly into lower tie plates. Such threaded ends 420 and example embodiment end pieces having threaded ends are useable in conjunction with tie rods used to lift and move fuel bundles do to their rigid connection therewith. Although example embodiment end piece 400 is shown with snap-in receptor style end piece 410 and threaded end 420 different from other example embodiments, it is understood that any mating element and/or end configuration discussed above may be used in combination with example end piece 300.

Although example embodiment end pieces 200, 300, and 400 have been discussed separately, it will be understood that features of one example embodiment may be used in combination with other example embodiments. For example, a cladding shown on one example embodiment may be used on another example embodiment lacking a cladding but having a housing. Similarly, fabrication materials and irradiation targets may be used in alternate combinations across example embodiments. Similarly, housings and cladding may be used on example embodiment end pieces being used as upper and/or lower end pieces. Further, example embodiment end pieces having threading may be substituted with other elements from example embodiment end pieces having tapers.

Because example embodiment end pieces and fuel rods provide irradiation target placement at positions not possible in conventional fuel rods, example embodiments may allow unique irradiation and irradiation target generation. For example, placement of irradiation targets at areas of lower and/or constant flux at ends of a reactor core may allow for successful conversion and harvesting of isotopes with shorter half-lives or whose decay chain includes elements with higher cross sections that may be destroyed at higher flux locations.

Example embodiments thus being described, it will be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A fuel rod comprising:
at least one fuel element;
a cladding containing the at least one fuel element; and
at least one end piece including,
    at least one non-fissile irradiation target within the at least one end piece, the at least one non-fissile irradiation target having nuclear properties that substantially change when exposed to a neutron flux in an operating nuclear reactor, and
    a connection element configured to join the at least one end piece to an axial end of the fuel rod,
wherein the at least one end piece is formed entirely out of the at least one non-fissile irradiation target.

2. The fuel rod of claim 1, wherein the connection element is configured to removably join the at least one end piece to the axial end of the fuel rod.

3. The fuel rod of claim 2, wherein the connection element is one of a threaded end and a snap-in receptor.

4. The fuel rod of claim 1, wherein the non-fissile irradiation target is at least one of Cobalt-59 and Iridium-191.

5. The fuel rod of claim 1, wherein the at least one end piece further includes a housing contained entirely within the at least one end piece, the housing configured to receive and contain another of the at least one non-fissile irradiation target.

6. The fuel rod of claim 5, wherein the housing includes at least one containment structure within the housing configured to provide a double containment to the another of the at least one non-fissile irradiation target.

7. The fuel rod of claim 6, wherein the at least one containment structure within the housing includes a container indicia indicating at least the contents of the at least one containment structure.

8. The fuel rod of claim 5, wherein the housing includes at least one wafer rigidly attached to the end piece and compartmentalizing the housing.

9. The fuel rod of claim 1, wherein the at least one end piece further includes at least one exterior indentation marking and facilitating breaking of the end piece during dismantling.

10. The fuel rod of claim 1, wherein the at least one end piece further includes a taper shaped to axially mate with one of an upper tie plate and a lower tie plate so as to rigidly join the fuel rod and one of the upper and lower tie plate via the at least one end piece.

11. The fuel rod of claim 1, wherein the at least one end piece further includes a material plating the at least one end piece, the material configured to provide radioactive containment to the at least one end piece.

12. The fuel rod of claim 1, wherein the at least one end piece further includes a threaded end configured to screw into one of an upper tie plate and a lower tie plate so as to rigidly join the fuel rod and one of the upper and lower tie plate via the at least one end piece.

13. The fuel rod of claim 12, wherein the at least one end piece extends through the upper tie plate so as to permit the fuel rod to act as a tie rod.

14. The fuel rod of claim 1, wherein the at least one end piece further includes an exterior indicia that indicates at least the at least one non-fissile irradiation target of the at least one end piece.

15. The fuel rod of claim 1, wherein the at least one end piece is configured to be an uppermost or lowermost structure of the fuel rod.

16. A fuel rod end piece comprising:
at least one non-fissile irradiation target having nuclear properties that substantially change when exposed to a neutron flux in an operating nuclear reactor, and
a connection element configured to join the end piece to an axial end of a nuclear fuel rod,
wherein the fuel rod end piece is formed entirely out of the at least one non-fissile irradiation target.

17. The fuel rod end piece of claim 16, wherein the non-fissile irradiation target is one of Iridium-191 and cobalt-59.

18. A fuel bundle comprising:
an upper tie plate;
a lower tie plate;
a plurality of nuclear fuel rods axially arranged between the upper tie plate and the lower tie plate, each of the plurality of nuclear fuel rods including,
at least one fuel element;
a cladding containing the at least one fuel element; and
at least one end piece including,
at least one non-fissile irradiation target within the at least one end piece, the at least one non-fissile irradiation target having nuclear properties that substantially change when exposed to a neutron flux in an operating nuclear reactor, and
a connection element configured to join the at least one end piece to an axial end of one of the plurality of nuclear fuel rods,
wherein the at least one end piece is formed entirely out of the at least one non-fissile irradiation target.

19. The fuel bundle of claim 18, wherein the non-fissile irradiation target is one of Iridium-191 and Cobalt-59.

* * * * *